Aug. 31, 1954     F. W. SCHWINN     2,687,898
SPRING FORK CONSTRUCTION FOR BICYCLES
Filed Dec. 26, 1950     2 Sheets-Sheet 1
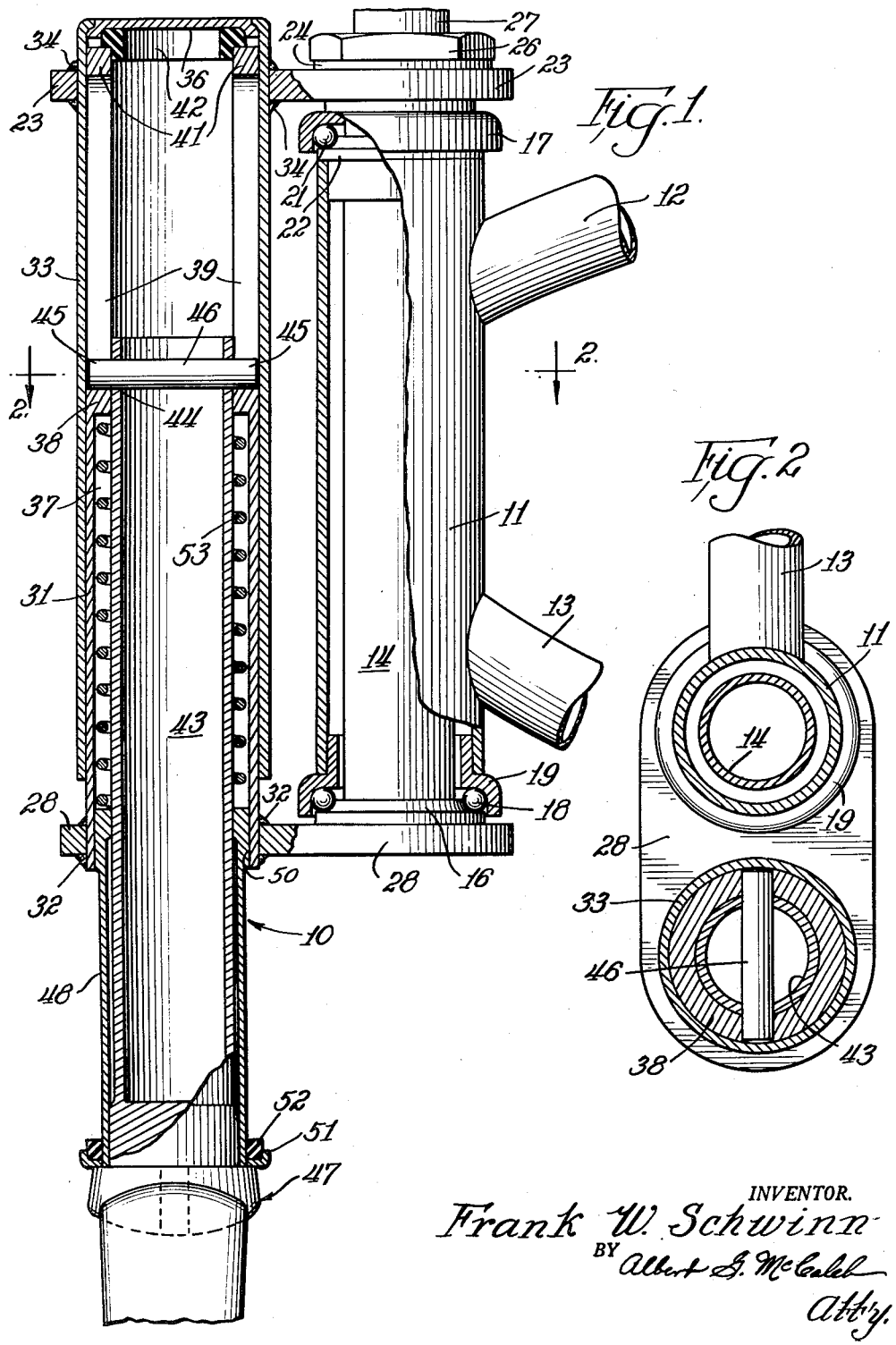
INVENTOR.
Frank W. Schwinn
BY Albert G. McCaleb
Atty.

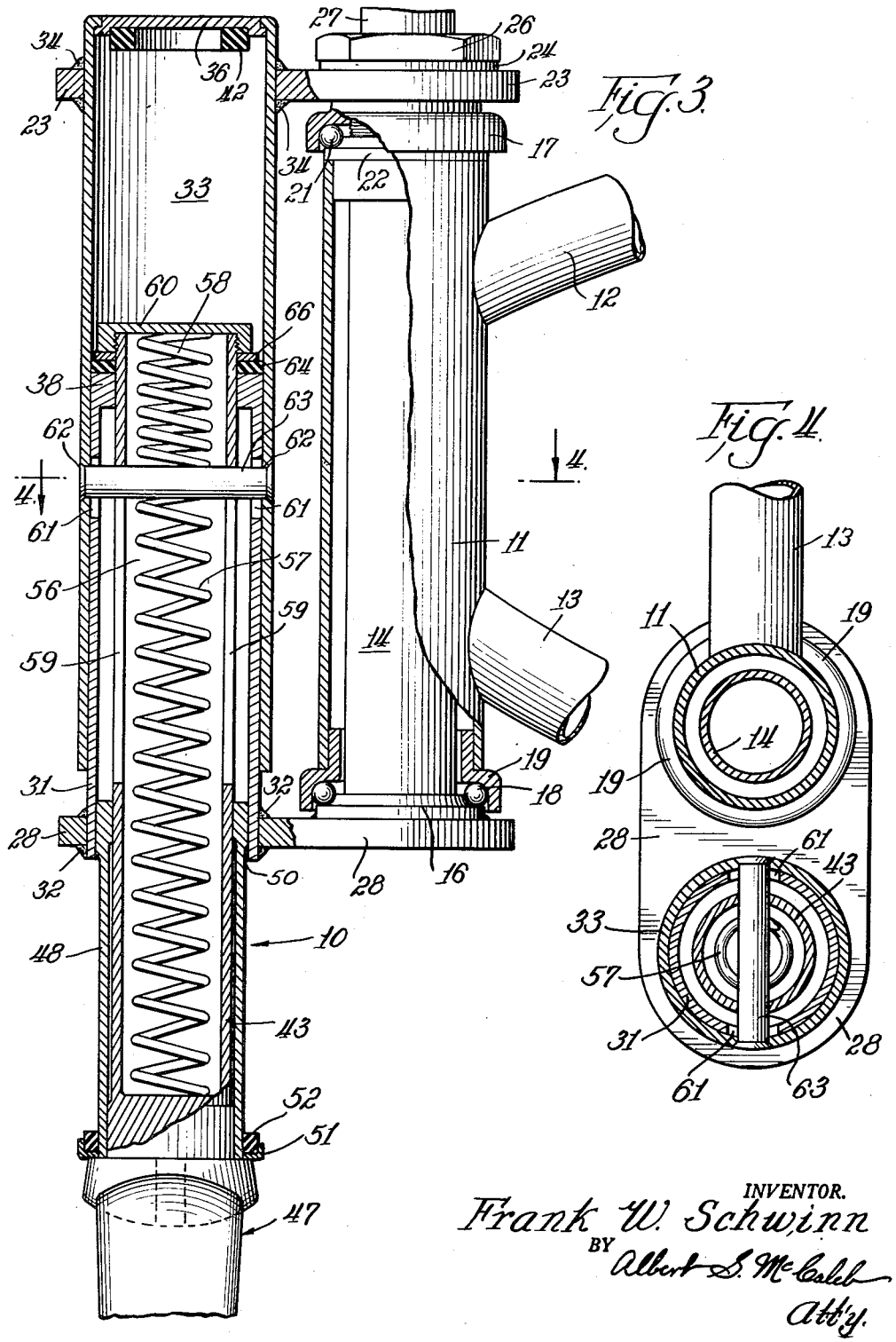

Patented Aug. 31, 1954

2,687,898

UNITED STATES PATENT OFFICE 2,687,898

SPRING FORK CONSTRUCTION FOR BICYCLES

Frank W. Schwinn, Chicago, Ill.

Application December 26, 1950, Serial No. 202,727

5 Claims. (Cl. 280—276)

My invention relates to a front wheel fork construction for bicycles, and more particularly to such a construction embodying a spring-action, shock-absorbing mechanism.

It is an object of my invention to provide an improved bicycle spring fork adapted for installation on and use with a bicycle frame of conventional construction.

A further object of my invention is to provide a spring fork construction for bicycles in which the moving and shock-absorbing parts are covered and protected.

A still further object of my invention is the provision of a bicycle wheel fork construction adapted to absorb shocks occurring to the front wheel while maintaining proper stability and steering control.

Further objects and advantages of this invention will be apparent from the following description of preferred embodiments of the invention and the two sheets of drawings relating thereto, in which:

Fig. 1 is a side elevational view, partly in section, of the front portion of a bicycle frame including a spring fork construction which embodies my invention;

Fig. 2 is a plan sectional view taken substantially on a line 2—2 of Fig. 1;

Fig. 3 is a side elevational view, similar to that shown in Fig. 1, of a modified form of my invention; and Fig. 4 is a plan sectional view taken substantially on a line 4—4 of Fig. 3.

In the accompanying drawings, both of the exemplary embodiments of my spring fork assembly 10 are shown in their assembled relationship relative to a head tube 11 of a standard bicycle frame which includes frame tubes 12 and 13 secured to the head tube. In each instance, the spring fork assembly has the front wheel of the bicycle secured thereto and is rigidly connected to the upper and lower ends of a steering post 14 by relatively heavy mounting straps 23 and 28 which extend forwardly of the frame from the steering post and turn therewith. Support of the steering post 14 for rotational movement relative to the head tube 11 is accomplished in a relatively conventional manner by the use of ball bearings at the opposite ends of the head tube. As depicted, bearing balls 18, at the lower end of the head tube, are carried between an inner race 16 secured to the lower end of the steering post and an outer race 19 secured to the lower end of the head tube. At the upper end of the head tube, an inner race 22 is secured thereto and an outer race 17 is mounted on the steering post.

A series of bearing balls 21 is operatively engaged between the races 17 and 22.

For securing the spring fork assembly 10 to the upper and lower ends of the steering post 14, straps 23 and 28 each have ends rigidly secured to the steering post. The strap 23 has an opening in which the top of the steering post fits snugly, and is held rigidly between race 17 and a washer 24 by a steering post nut 26 threadedly engaging the steering post 14. The lower strap 28 is securely affixed to the lower end of the steering post by being brazed or welded thereto. The straps 23 and 28 swing laterally upon rotation of the steering post, and are adapted to support the spring fork assembly 10 in front of the head tube 11. A handle bar stem 27 is secured to the upper end of the steering post.

The spring fork assembly 10 comprises a spring sleeve 31 snugly and slidably engaged within a main housing tube 33; the main housing tube having an end closure 36 affixed to its upper end. In supporting the spring fork assembly on the head tube 11, the spring sleeve 31 and the main housing tube 33 extend through openings in the straps 28 and 23 respectively, and are suitably secured, as by welds 32 and 34, to lower strap 28 and upper strap 23, respectively. Thus mounted, the spring fork assembly 10 swings laterally about the axis of the steering post upon rotation of the steering post. The disclosed arrangement of the spring sleeve 31 and the main housing tube 33 is such that together they effectively serve as elements of a protective housing for the moving parts of the shock-absorbing mechanism. Additionally, the relative axial movability and separability of the spring fork parts to which the straps are secured prevents the spring fork from interfering with the customary adjustment of the steering post bearings, as well as providing for the disassembly of the steering post from the head tube.

As shown in Figs. 1 and 2, spring sleeve 31 is externally cylindrical with a cylindrical spring cavity 37 provided in its lower portion. At the upper end of the cavity 37 is header flange 38 integrally formed on the spring sleeve and providing a bearing surface for abutment with the upper end of a compression spring 53 which is contained in the cavity. Above the header flange 38 and on diametrically opposed sides of an upper end portion of the spring sleeve 31 are slots 39 extending lengthwise of the sleeve and terminating at abutments 41 and at flange 38. Between the upper end of the sleeve 31 and end closure 36 is a resilient bumper ring 42, made of rubber or the like.

Telescopically engaged within the spring sleeve 31 is cylindrical fork stem 43 which is adapted to move reciprocally within the sleeve; the upper end of the fork stem being slidably journalled in the upper end portion of the spring sleeve. The upper portion of the fork stem 43 has diametrically aligned openings 44 in its wall which snugly receive a pin 46 having opposite end portions 45 projecting from the wall. The projecting end portions 45 of the pin extend outwardly from the wall of the fork stem and are slidably received in slots 39 of the spring sleeve. Such engagement of the ends of pin 46 in slots 39 prevents rotational movement of the stem relative to the spring sleeve as it slides up and down in the sleeve. It is contemplated that any stud-like projection similar to that provided by the ends of pin 46 will accomplish the desired engagement of the fork stem with slots 39, of the spring sleeve.

The lower end of the fork stem 43 is rigidly secured to a wheel fork 47. Mounted on that portion of the fork stem adjacent to the wheel fork 47 is a combination spacer and header sleeve 48. That sleeve has a bearing portion 50 at its upper end which fits slidably into the spring sleeve 31 and serves as a lower bearing for axial movement of the fork stem relative to the spring sleeve and main housing tube, and additionally provides a lower seat for the compression spring 53. Being thus associated with the fork stem and spring sleeve, the sleeve 48 spaces the lower end of the spring sleeve from the fork stem, so as to afford room for free movement of the compression spring 53 therebetween. With the disclosed arrangement of parts, force effecting movement of the fork stem into the main housing tube is resiliently absorbed by the spring 53, since the header sleeve moves with the fork stem and the upper spring abutment remains stationary. A flange 51 projecting radially from the lower end of the collar 48 supports a resilient bumper washer 52 which limits movement of the fork stem toward the main housing tube.

The action of the spring fork construction shown in Figs. 1 and 2 is such that the normal weight carried on the bicycle effects some movement of the stem tube into the main housing tube against the action of the spring, and further shock absorbing action of the spring cushions road shocks against the front wheel of the bicycle while it is being ridden. As the fork stem moves into and from the main housing tube 33, the pin 46 slides upwardly and downwardly in slots 39, and the upward movement of the fork stem is opposed by the increasing compression of spring 53. Where the shock is sufficiently great to thrust the stem into a completely compressed position, resilient bumpers 42 and 52 diminish the force of the contact, if any, of pin 46 with abutments 41. As this shock-absorbing action is in a vertical direction, losses of stability and steering control resulting from shocks are minimized.

In the embodiment of the invention illustrated in Figs. 3 and 4, mounting of the spring fork assembly 10 to the steering post of a bicycle and in reference to the head tube thereof is like that of the described form.

As depicted in Figs. 3 and 4, however, the hollow interior of the cylindrical fork stem 43 provides a cavity 56 in which coil springs, such as 57 and 58 are mounted. The fork stem 43 has two relatively long longitudinal slots 59 oppositely disposed in the upper portion thereof. As in the previously described form, the lower end of the fork stem is rigidly secured to the wheel fork 47. Over the upper end of the stem is a closure cap 60 which is threaded onto the stem.

The upper end of the fork stem 43 is slidably engaged within the bearing portion 38 of the spring sleeve 31, while the lower end thereof is supported for axial sliding movement in the bearing portion at the upper end of the header sleeve 48 which is secured to the fork stem. The header sleeve 48 has a flange 51 extending radially from its lower end which supports a resilient bumper ring 52. The spring sleeve 31 is also provided with relatively short axial slots 61 at diametrically opposed positions and aligned laterally with the slots 59 in the fork stem. At the upper end of the spring sleeve 31 is a resilient bumper 64 and a washer 66 aligned for engagement with the rim flange of the closure cap 60, thereby to provide a stop for movement of the fork stem from the main housing tube.

The spring sleeve 31 is mounted for limited sliding movement within the main housing tube 33 to permit assembly and disassembly of the spring fork structure with respect to the head tube 11 of a bicycle and to provide for adjustment of the head tube bearings. The housing tube is closed at its upper end by the plug 36 to the inside of which is affixed resilient bumper 42. Aligned and diametrically opposed openings 62 are provided in the walls of the main housing tube 33 to receive a pin 63 which extends through such openings and through the slots 61 of the spring sleeve, as well as through the slots 59 of the fork stem. The pin 63 is riveted at its opposite ends, or otherwise secured in place relative to the main housing tube 33. The pin 63 is slidable along slots 59 in the fork stem to permit the fork stem to be moved linearly through the spring sleeve and relative to the main housing tube. The bumper ring 42 on closure plug 36 is aligned for engagement with the closure cap 60 on the fork stem to provide a stop for movement of the fork stem into the main housing tube.

The disclosed spring arrangement of Figs. 3 and 4, embodies the two springs 57 and 58 within the fork stem and provides a dual spring action resulting from unbalanced counterforces exerted on pin 63 by the springs 57 and 58. In this dual spring arrangement, the spring 57 is a relatively strong compression spring bearing against pin 63 at one end and the lower end of the fork stem at its other end. It is adapted to resist movement of the fork stem within the main housing tube. Coil spring 58 is also a compression spring, but is somewhat weaker than the spring 57 and bears against pin 63 at one end and against the closure 60 at its other end, thereby being adapted to resist movement of the fork stem out of the main housing tube.

Spring 57, being stronger than spring 58 dominates the dual spring action, and under normal conditions urges the fork stem into its fully extended position. When the stem is compressed into the spring sleeve by the force of a shock occurring to the front wheel, such compression is resisted by spring 57. After the force causing compression of the stem has been spent, the stem begins its outward movement. Since this outward movement is resisted by spring 58, the secondary shock caused by the rebound of the fork stem is minimized, thereby affording greater riding comfort.

When a single spring action is desired, similar to that obtained in the embodiment shown in Figs. 1 and 2, spring 57 may be used alone, in which instance, the only spring action provided is resistance to the inward movement of the fork stem.

The spring fork construction thus described provides effective shock-absorbing action, while maintaining ease of steering control and general stability of the bicycle. The covering of the moving parts of the shock-absorbing mechanism by the main housing tube 33 not only gives an improved appearance to the bicycle frame but also protects the parts against rain, dirt and the like.

The above detailed description of the specific embodiments of my invention has been given for purposes of illustration, and it is to be understood that my invention is to be limited only by the scope of the appended claims.

Having thus described my invention, what I claim as new and desire to secure by Letters Patent of the United States is:

1. In a spring fork construction adapted to use on a bicycle or the like having a steering post supported for rotation relative to a head tube of a frame structure, the combination comprising mounting straps at upper and lower ends of the steering post and projecting therefrom in a direction lateral to the axis of the steering post, one of said mounting straps being permanently secured to the steering post and the other being removably secured thereto, a main cover tube secured to the upper one of the straps and having a cylindrical inner surface open at one end of the tube, a sleeve fitted snugly into the main cover tube and having an end portion projecting from said one end of the main cover tube, the projecting end portion of the sleeve being secured to the lower one of the straps, a fork stem journalled for linear sliding movement in the sleeve, a compression spring extending from a fixed position along the fork stem to a fixed stop at the longitudinal mid-portion of the main cover tube for normally biasing the fork stem to a position in which it extends from the sleeve, and means including a pin extending through the fork stem and into opposed openings in opposite sides of the sleeve for preventing rotational movement of the fork stem relative to the sleeve.

2. In a spring fork construction as defined in claim 1, said sleeve providing a bearing portion internally of the main cover tube for receiving a fork stem for sliding movement, a spacing sleeve mounted on the fork stem and having a bearing portion slidable in the first mentioned sleeve, said spring being mounted between the first mentioned sleeve and the fork stem and having opposite ends abutting said bearing portion of the first mentioned sleeve and said spacing sleeve, and a stop for limiting movement of the fork stem from the first mentioned sleeve.

3. In a spring fork construction as defined in claim 1, said sleeve including a header flange having longitudinally extending opposed slots and providing a bearing portion internally of the main cover tube for receiving the fork stem for sliding movement, said spring being mounted between the sleeve and the fork stem and acting between the header portion and the fork stem, and said pin projecting into said slots so as to be slidably engaged with said slots to prevent relative rotation of the fork stem and said sleeve.

4. In a spring fork construction adapted to use on a bicycle or the like having a steering post supported for rotation relative to a head tube of a frame structure, the combination comprising mounting straps at upper and lower ends of the steering post and projecting therefrom in a direction lateral to the axis of the steering post, one of said mounting straps being permanently secured to the steering post and the other being removably secured thereto, a main cover tube secured to the upper one of the straps and having a cylindrical inner surface open at one end of the tube, a sleeve fitted snugly into the main cover tube and having the end portion projecting from said one end of the main cover tube, the projecting end portion of the sleeve being secured to the lower one of the straps, said sleeve providing a bearing portion internally of the main cover tube, an axially slotted fork stem journalled in said bearing portion of the sleeve for linear sliding movement in the sleeve, a spacing sleeve mounted on the fork stem and having a bearing portion thereon in spaced relationship to the end of the fork stem and slidable in the first mentioned sleeve, a compression spring normally biasing the fork stem to a position in which it extends from the sleeve, and means extending across the mid-portion of the main cover tube and secured to said main cover tube to provide a stationary spring abutment internally of the main cover tube, the last mentioned means extending through the slots in the fork stem for preventing rotational movement of the fork stem relative to the sleeve, and said spring being mounted internally of the fork stem and having opposite ends acting against said stationary spring abutment and said fork stem.

5. In a spring fork construction as defined in claim 4, the combination being further characterized by a second compression spring weaker than the first mentioned spring and acting between said stationary spring abutment and a cap secured to the end of the fork stem so as to oppose the first mentioned spring.

References Cited in the file of this patent

UNITED STATES PATENTS

| Number | Name | Date |
|---|---|---|
| 2,477,748 | Hutchins | Aug. 2, 1929 |

FOREIGN PATENTS

| Number | Country | Date |
|---|---|---|
| 7,845 | Great Britain | of 1909 |
| 37,848 | Sweden | Dec. 5, 1913 |
| 49,600 | Denmark | Nov. 20, 1934 |